Patented Sept. 10, 1935

2,013,731

UNITED STATES PATENT OFFICE 2,013,731

PROCESS FOR PRODUCING SALTS OF ACETYL-CHOLINE

Randolph T. Major, Westfield, and Joseph K. Cline, Rahway, N. J., assignors to Merck & Co., Inc., of Rahway, N. J., a corporation of New Jersey No Drawing. Application March 30, 1931, Serial No. 526,544

7 Claims. (Cl. 260—25)

This invention relates to improvements in the production of various salts of acetyl-choline, in a manner particularly of value with respect to simplicity of operation, yield, and purity.

The process is applicable for the acetylation of various salts of choline as may be found appropriate or suitable for medicinal uses, and especially for the production of acetyl-choline chloride in terms of which the invention will be exemplified in a manner which will enable the chemist to apply it by adaption to other given salts.

The production of acetyl-choline chloride has long been the subject of investigation by a number of renowned chemists, but only quite recently has acetyl-choline chloride been isolated and its physical and chemical properties determined.

Baeyer, [Ann., 142, 325] (1867) and later Nothnagel, [Arch. Pharm., 232, 265] (1894), attempted to synthesize pure acetyl choline chloride when they treated choline chloride with acetyl chloride. Instead they obtained an oil which manifestly contained acetyl choline chloride but they did not succeed in obtaining the pure salt. Fourneau and Page, [Bull. soc. chem., (4), 15, 552] (1914) prepared acetyl choline bromide by the interaction of trimethylamine and β-bromoethyl acetate. However, they were not able to isolate pure acetyl choline chloride from the corresponding interaction of trimethylamine and β-chloroethyl acetate. Abderhalden and Paffrath [Fermentforschung, 8, 299] (1925) detected small amounts of acetyl choline in the product of interaction of choline and sodium acetate in the presence of an enzyme.

We are also familiar with the work of Hunt (Jour. of Pharmac. and Exper. Therap., vol. 7, 1915, p. 301) who has done considerable valuable and enlightening work in his comparative pharmacological studies of choline and acetyl-choline. His reports indicate that he succeeded in acetylating choline with acetyl chloride in solution but he also never isolated acetyl-choline chloride.

One of us (R. T. Major, in conjunction with L. W. Jones), succeeded in synthesizing the iodide and the chloride of acetyl-choline, the former by the action of methyl iodide on β-dimethyl-aminoethyl acetate and the latter by the action of silver chloride on the iodide, as set forth in the co-pending application of Major and Jones, Serial No. 529,542, filed April 11, 1931. The other of us (J. K. Cline) has also succeeded in producing an extensive series of acyl-choline salts by means of acylating various corresponding salts of choline with aliphatic acid anhydrides, as set forth in the co-pending application of Cline, Serial No. 526,549, filed March 30, 1931.

We have now found that we can directly synthesize pure salts of acetyl choline by simply treating choline or its corresponding salts with a large excess of glacial acetic acid. The new process is, however, materially expedited with the employment of a catalytic agent, preferably acetyl chloride or dry hydrogen chloride. The salt of acetyl choline is precipitated by adding an inert solvent which is miscible with acetic acid but in which the formed salt is insoluble. By way of exemplification we present some of the preferred forms of employing the process, with and without a catalyst or adjuvant agent.

Example I.—Five parts of dry choline chloride are dissolved in 50 parts by weight of glacial acetic acid. To this solution are added 6 parts of acetyl chloride. The solution is refluxed for three hours, or until evolution of hydrogen chloride ceases. The solution is then cooled and anhydrous ether is added. An oil at first precipitates which soon solidifies. In order to purify it, it is dissolved in absolute alcohol and reprecipitated with anhydrous ether. The acetyl-choline chloride thus produced occurs in the form of a white crystalline solid, melting at 151° C. It is readily soluble in water and alcohol.

Example II.—Two parts of dry choline chloride are dissolved in 10 parts by weight of glacial acetic acid. This solution is saturated with dry hydrogen chloride. It is then heated under reflux for about four hours. At the end of this time the solution is cooled and anhydrous ether is added. An oil precipitates which later solidifies. In order to purify it, it is dissolved in absolute alcohol and reprecipitated with anhydrous ether. The acetyl-choline chloride occurs in the form of a white crystalline solid, melting at 151° C.

Example III.—Ten parts of dry choline chloride are dissolved in 100 parts of glacial acetic acid. The solution is heated to 100° C. for about 40 hours. It is cooled and anhydrous ether is added. An oil precipitates which later solidifies. In order to purify it, it is dissolved in absolute alcohol and reprecipitated with anhydrous ether. Acetyl choline chloride occurs in the form of a white crystalline solid, melting at 151° C.

When choline itself is thus treated with glacial acetic acid, in a manner analogous to the processes set forth in the foregoing examples, the product obtained is acetyl-choline acetate.

Having thus set forth our invention, we request the allowance of the following claims.

1. The process of making acetyl choline chloride embracing the steps of dissolving dry choline chloride in an excess of glacial acetic acid, heating the solution for a prolonged period, thereafter cooling and adding anhydrous ether to precipitate an oily precipitate, allowing the precipitate to solidify, and purifying the solid thus obtained, by dissolving the same in absolute alcohol and reprecipitating with anhydrous ether.

2. The process of making acetyl choline chloride embracing the steps of dissolving ten parts of dry choline chloride in 100 parts of glacial acetic acid, heating the solution to 100° C. for about 40 hours, cooling the reaction mixture and adding anhydrous ether to precipitate the formed acetyl choline chloride, and thereafter purifying the precipitated reaction product by dissolving the same in absolute alcohol and reprecipitating with anhydrous ether.

3. In a process for making acetyl choline chloride, the step which involves reacting with glacial acetic acid upon dry choline chloride.

4. In a process for making a given salt of acetylcholine, the step which involves reacting upon the corresponding salt of choline with glacial acetic acid.

5. The process of making acetyl choline chloride embracing the steps of dissolving dry choline chloride in an excess of glacial acetic acid, in the presence of a non-basic esterification catalyst selected from the group consisting of acetyl chloride and hydrogen chloride, heating the solution for a prolonged period, thereafter cooling and adding anhydrous ether to precipitate an oily precipitate, allowing the precipitate to solidify, and purifying the solid thus obtained, by dissolving the same in absolute alcohol and reprecipitating with anhydrous ether.

6. The process of making acetyl choline chloride embracing the steps of dissolving dry choline chloride in an excess of glacial acetic acid, in the presence of a catalyst consisting of acetyl chloride, heating the solution for a prolonged period, thereafter cooling and adding anhydrous ether to precipitate an oily precipitate, allowing the precipitate to solidify, and purifying the solid thus obtained, by dissolving the same in absolute alcohol and reprecipitating with anhydrous ether.

7. The process of making acetyl choline chloride embracing the steps of dissolving dry choline chloride in an excess of glacial acetic acid, saturating the solution with a catalyst consisting of dry hydrogen chloride, heating the solution for a prolonged period, thereafter cooling and adding anhydrous ether to precipitate an oily precipitate, allowing the precipitate to solidify, and purifying the solid thus obtained, by dissolving the same in absolute alcohol and reprecipitating with anhydrous ether.

RANDOLPH T. MAJOR.
JOSEPH K. CLINE.